(12) United States Patent  (10) Patent No.: US 11,514,596 B2
Kadowaki et al.  (45) Date of Patent: Nov. 29, 2022

(54) SHAPE IDENTIFICATION DEVICE AND DELIVERY BOX (71) Applicant: Panasonic Intellectual Property Management Co., Ltd., Osaka (JP)

(72) Inventors: Nobuaki Kadowaki, Kyoto (JP); Takeshi Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 259 days.

(21) Appl. No.: 16/955,244

(22) PCT Filed: Aug. 8, 2018

(86) PCT No.: PCT/JP2018/029773
§ 371 (c)(1),
(2) Date: Jun. 18, 2020

(87) PCT Pub. No.: WO2019/130642
PCT Pub. Date: Jul. 4, 2019

(65) Prior Publication Data
US 2020/0327687 A1  Oct. 15, 2020

(30) Foreign Application Priority Data
Dec. 27, 2017  (JP) .............................. JP2017-252421

(51) Int. Cl.
*G06T 7/55* (2017.01)
*G01B 11/14* (2006.01)
(Continued)

(52) U.S. Cl.
CPC ................ *G06T 7/55* (2017.01); *G01B 11/14* (2013.01); *G01B 11/24* (2013.01); *G06T 7/60* (2013.01)

(58) Field of Classification Search
CPC .. G06T 7/55; G06T 7/60; G01B 11/14; G01B 11/24
(Continued)

(56) References Cited

U.S. PATENT DOCUMENTS

2002/0106135 A1   8/2002  Iwane
2010/0017407 A1*  1/2010  Ben .................... G06V 20/64
                                                707/E17.016
(Continued)

FOREIGN PATENT DOCUMENTS

JP    H08-075418 A    3/1996
JP    H09-179988 A    7/1997
(Continued)

OTHER PUBLICATIONS

Search Report and Written Opinion issued in corresponding Singapore Patent Application No. 11202005623P dated Jul. 23, 2021.
International Search Report and Written Opinion for corresponding Application No. PCT/JP2018/029773, dated Sep. 4, 2018.

*Primary Examiner* — Loi H Tran
(74) *Attorney, Agent, or Firm* — Renner, Otto, Boisselle & Sklar, LLP (57) ABSTRACT

A shape identification device includes an accommodation chamber for accommodating an object to be measured such that the same can be removed from and inserted into the accommodation chamber, a first imaging unit for imaging the object accommodated in the accommodation chamber, and an image processing unit for carrying out image processing on the basis of the image information imaged by the first imaging unit and recognizing the external shape of the object. The image processing unit includes a storage unit having, stored therein beforehand, a plurality of types of sample external shapes corresponding to objects to be measured and a shape recognition unit for comparison and discrimination of the external shape information from the (Continued)

first imaging unit and the external shape information stored in the storage unit and recognition of an external shape matching or approximating the external shape information from the first imaging unit.

1 Claim, 10 Drawing Sheets

(51) Int. Cl.
*G01B 11/24* (2006.01)
*G06T 7/60* (2017.01)

(58) Field of Classification Search
USPC .......................................................... 382/101
See application file for complete search history.

(56) References Cited

U.S. PATENT DOCUMENTS

| | | | |
|---|---|---|---|
| 2015/0193733 A1 | 7/2015 | Bouzit-Benbernou | |
| 2017/0090676 A1* | 3/2017 | Chen | G06F 3/04166 |
| 2017/0372127 A1* | 12/2017 | Meany | G06T 17/00 |
| 2018/0374232 A1* | 12/2018 | Kadowaki | G06T 5/003 |

FOREIGN PATENT DOCUMENTS

| | | | | |
|---|---|---|---|---|
| JP | H09-196636 A | | 7/1997 | |
| JP | 2017-116482 A | | 6/2017 | |
| JP | 2017-187822 A | | 10/2017 | |
| JP | 2017187822 A | * | 10/2017 | |
| WO | 2002/01505 A1 | | 1/2002 | |
| WO | WO-2017110071 A1 | * | 6/2017 | B65G 1/04 |

\* cited by examiner

SHAPE IDENTIFICATION DEVICE AND DELIVERY BOX

CROSS REFERENCE TO RELATED APPLICATION

The entire disclosure of Japanese Patent Application No. 2017-252421 filed on Dec. 27, 2017, including the specification, claims, drawings, and abstract is incorporated herein by reference in its entirety.

TECHNICAL FIELD

The present disclosure relates to a shape identification device and a delivery box.

BACKGROUND

As described in Patent Literature 1, there has been conventionally known a delivery box that is installed in a public place where unspecified persons can use it, and includes a plurality of accommodation chambers (containers). This delivery box can be used by a large number of unspecified persons to send delivery parcels. When a sender puts a delivery parcel in a container of a measurement device of the delivery box, the dimension of the delivery parcel is measured by the measurement device. As a result, an optimum container for the delivery parcel is selected from containers having two sizes for delivery parcels, and the door of the selected container is automatically opened. The sender places the delivery parcel in the selected container for the delivery parcel.

CITATION LIST

Patent Literature

Patent Literature 1: JP 2017-116482 A

SUMMARY

Technical Problem

The measurement device described in Patent Literature 1 can automatically measure dimensions of measurement objects each having a rectangular parallelepiped shape or the like in which three surfaces to be imaged by an imaging unit are rectangular. Since such a measurement device limits the types of shapes of delivery parcels that can be measured by the measurement device, there is room for improvement from the viewpoint of expanding the types of measurement target objects whose dimensions can be automatically measured. Further, in order to automatically measure the sizes of delivery parcels, it is effective to automatically identify the shapes of the delivery parcels.

An object of the disclosure is to provide a shape identification device and a delivery box that can automatically identify the shape of a measurement target object accommodated in an accommodation chamber.

Solution to Problem

A shape identification device according to the present disclosure comprises: an accommodation chamber for accommodating a measurement target object such that the measurement target object is allowed to be taken in and out; a first imaging unit for imaging the measurement target object accommodated in the accommodation chamber; and an image processing unit for performing image processing based on information of an image captured by the first imaging unit to recognize an external shape of the measurement target object, wherein the image processing unit includes a storage unit for storing a plurality of types of sample external shapes corresponding to the measurement target object in advance, and a shape recognition unit for comparing external shape information from the first imaging unit with external shape information stored in the storage unit to perform identification, and recognizing an external shape that matches or approximates to the external shape information from the first imaging unit.

A delivery box according to the present disclosure comprises: the shape identification device of the present disclosure, and a dimension measurement unit for measuring a dimension of the measurement target object based on an external shape recognized by the shape recognition unit.

Advantageous Effect of Invention

According to the shape identification device and the delivery box of the present disclosure, it is possible to automatically identify the shape of a measurement target object accommodated in an accommodation chamber.

DESCRIPTION OF EMBODIMENT

Hereinafter, an embodiment of the present disclosure will be described with reference to the drawings. The shapes, numerical values, and numbers described below are examples for explanation, and can be appropriately changed according to the specifications of the shape identification device and the delivery box. Hereinafter, similar elements will be represented by the same reference signs in all drawings. Further, in the description in the text, the reference signs described earlier are used as necessary.

In the following description and drawings, an X-direction is a width direction of a delivery box 12, a Y-direction is a depth direction of the delivery box 12, and a Z-direction is a height direction of the delivery box 12. The X-direction, the Y-direction, and the Z-direction are orthogonal to one other.

Figure 1:
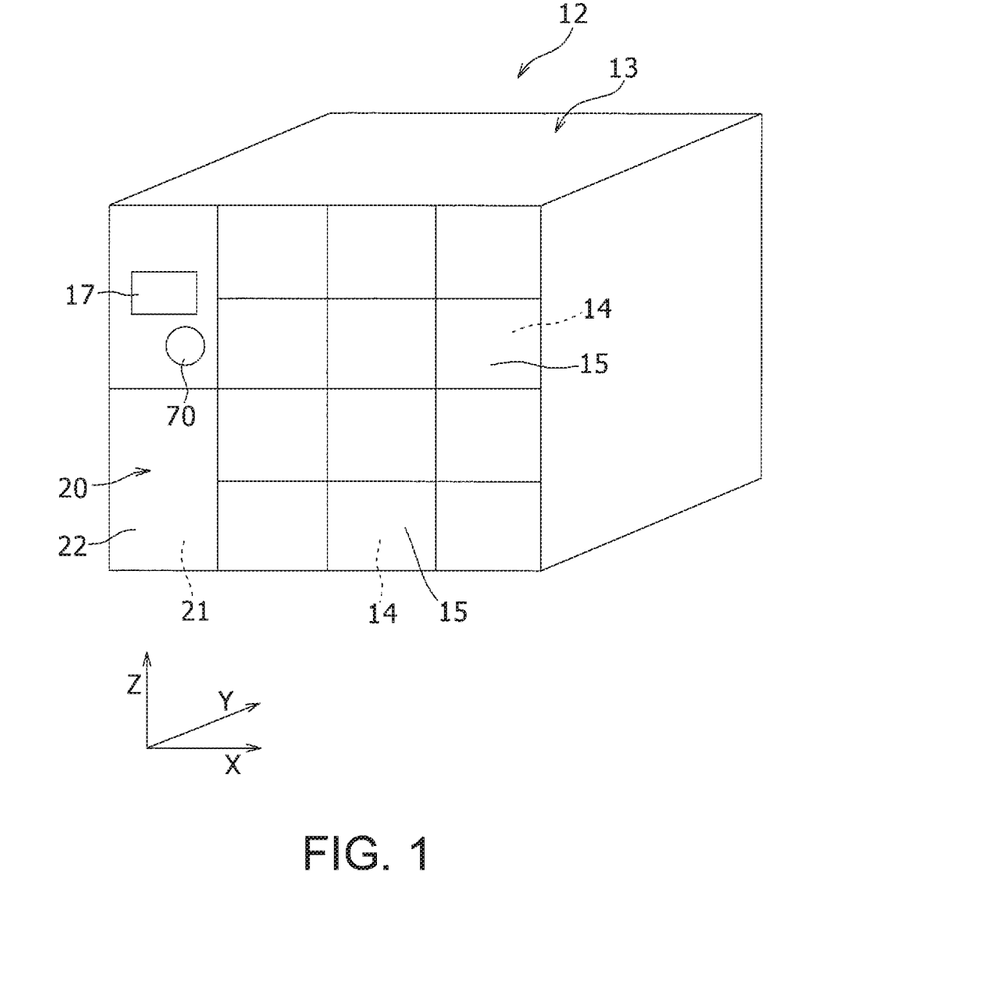
FIG. 1 is a perspective view of a delivery box according to an embodiment of the present disclosure.
Figure 2:
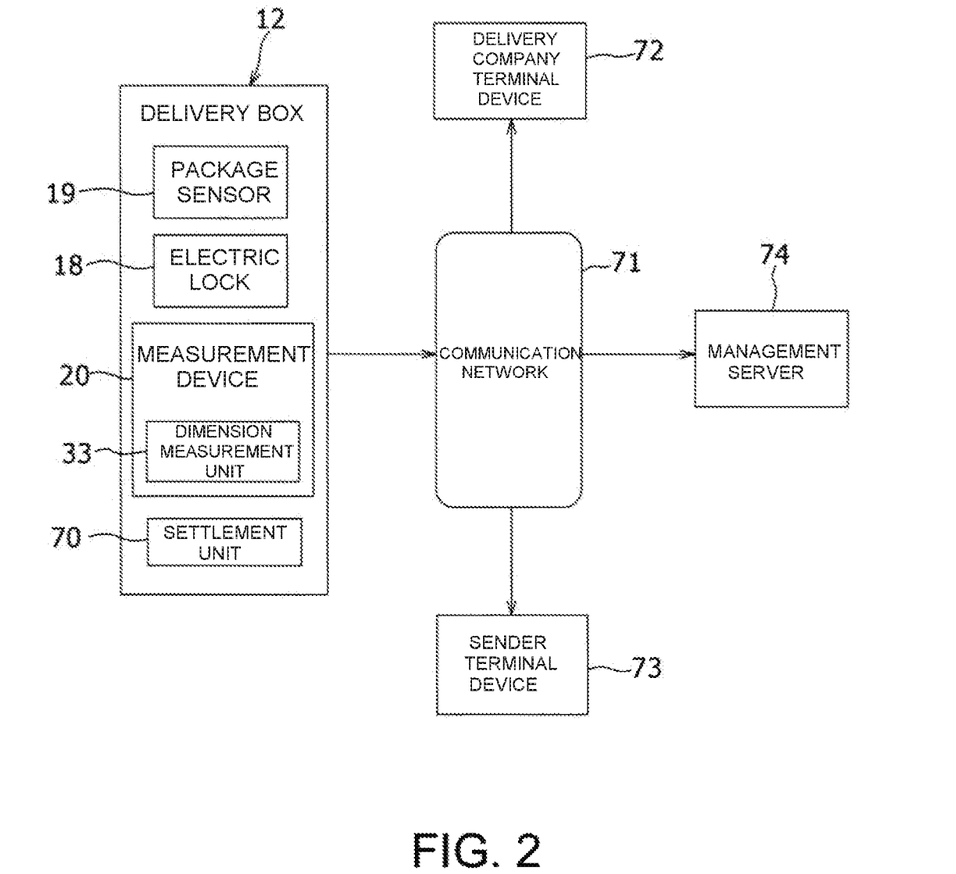
FIG. 2 is a diagram showing a configuration of a delivery box shown in FIG. 1 and a state in which a delivery request from the delivery box is notified to a party concerned.

FIG. 1 is a perspective view of the delivery box 12 according to an embodiment of the present disclosure. FIG. 2 is a view showing a configuration of the delivery box 12 and a state in which a delivery request from the delivery box 12 is notified to a party concerned. The delivery box 12 is installed in a public place where unspecified persons can use it, and can be used for a large number of unspecified persons to send delivery parcels.

As shown in FIG. 1, the delivery box 12 includes a substantially rectangular parallelepiped exterior body (main body) 13, a plurality of delivery accommodation chambers 14, doors 15 for opening and closing the openings of the respective delivery accommodation chambers 14, a measurement device 20, and an operation display unit 17. The measurement device 20 corresponds to a shape identification device. The delivery accommodation chamber 14 has a box-like shape for accommodating a delivery parcel 60 as a measurement target object (FIG. 3) such that it is allowed to be taken in and out.

The door 15 blocks an opening toward one side in the depth direction Y (toward a front side of the paper surface of FIG. 1) of the delivery accommodation chamber 14. The door 15 is a single swing type door attached to the delivery box 12, and can swing around an axis (not shown) of the Z-direction to open and close the opening of the delivery accommodation chamber 14. The door 15 of the delivery accommodation chamber 14 is locked by an electric lock 18 (FIG. 2). The electric lock 18 is unlocked by a user operation or the like on an operation display unit 17 (FIG. 1) described later. Note that the electric lock 18 may be configured to be unlocked by a bar code, a QR code (registered trademark), transmission and reception of a wireless signal using Bluetooth (registered trademark) with a portable terminal such as a smartphone, a touchless key using radio waves or infrared rays, an IC card, or an input based on a numeric keypad.

A package sensor 19 (FIG. 2) is provided inside the delivery accommodation chamber 14. The package sensor 19 detects the presence or absence of package such as a delivery parcel in the corresponding delivery accommodation chamber 14. The package sensor 19 is configured by, for example, a strain gauge. The strain gauge includes a metal resistance material, and the metal resistance material contracts when a compressive force is applied thereto from the outside, and the resistance value thereof decreases. Detection information of the package sensor 19 is transmitted to a control device 30 (FIG. 4) of the delivery box 12. The control device 30 detects the presence or absence of package from the weight of the package placed in the delivery accommodation chamber 14 based on the electric signal. When package is detected, the control device 30 converts the detection information into package detection information. The information detected by the package sensor 19 may be transmitted to a package sensor control unit (not shown) instead of the control device 30. In this case, the package sensor control unit converts the detection information of the package sensor 19 into package detection information. The package sensor 19 is provided in the delivery accommodation chamber 14, and may be configured to detect the presence or absence of package in the delivery accommodation chamber 14 by an optical sensor such as an infrared sensor.

The measurement device 20 includes a measurement accommodation chamber 21 arranged at a lower end portion in the height direction Z of one end portion (a left end portion in FIG. 1) in the width direction X of the delivery box 12, and a door which blocks an opening at one end (a front side end of the paper surface of FIG. 1) in the depth direction Y of the measurement accommodation chamber 21 so that the opening can be opened and closed. The configuration and function of the door 22 are similar to those of the door 15 of the delivery accommodation chamber 14. The door 22 of the measurement accommodation chamber 21 may be configured not to be locked. The configuration of the measurement device 20 will be described later in detail.

The operation display unit 17 is arranged above the measurement device 20 on one side surface (the front side of the paper surface of FIG. 1) in the depth direction Y of the delivery box 12. The operation display unit 17 is configured by a touch panel display or the like, and has a function of accepting an input by a user operation, and a function of a display unit. A settlement unit 70 is arranged below the operation display unit 17. The settlement unit 70 transmits and receives wireless signals to and from, for example, an IC card possessed by a user to settle accounts with electronic money. Note that the operation display unit 17 may be replaced by a configuration including a display unit configured by an LCD and an operation unit configured by a numeric keypad or the like. The settlement unit 70 may be configured so as to settle accounts by inputting an identification number and a password of a credit card by a numeric keypad.

When a sender of a delivery parcel who is a customer of a delivery company makes a delivery request for the delivery parcel by using the delivery box 12, the delivery request is performed as follows. For example, when the sender selects a display portion of "sending" from a menu screen displayed on the operation display unit 17 of the delivery box 12, the door 22 of the measurement device 20 automatically opens. When the sender places the delivery parcel in the measurement accommodation chamber 21 and closes the door 22, the measurement device 20 recognizes the shape of the delivery parcel in the measurement accommodation chamber 21, and then measures the size of the delivery parcel based on the shape. Further, the measurement device 20 calculates a volume as the size of the delivery parcel. The shape recognized by the measurement device 20, the measured dimension, etc. are displayed on the operation display unit 17.

The sender uses the operation display unit 17 to input an address of a sending destination and the like, and then takes out the delivery parcel from the measurement accommodation chamber 21. Note that the operation display unit 17 may be replaced by a configuration in which the address of the sending destination, etc. can be registered in advance by advance reservation using the Internet. Then, the sender uses the operation display unit 17 to select one of the delivery accommodation chambers 14. As a result, the door 15 of the selected delivery accommodation chamber 14 is unlocked, and the door 15 is automatically opened. Therefore, the sender accommodates the delivery parcel in the delivery accommodation chamber 14. It is detected by the package sensor 19 that the delivery parcel has been placed in the delivery accommodation chamber 14. Thereafter, a sending fee is displayed on the operation display unit 17, and thus the sender settles the sending fee by the settlement unit 70.

When a settlement for the delivery parcel has been performed, information of a delivery request for the delivery parcel is notified from the delivery box 12 to a terminal device 72 of a delivery company, a terminal device 73 of the sender, and a management server 74 via a communication network 71, as shown in FIG. 2. Therefore, the delivery company goes to an installation location of the delivery box 12, opens the door 15 of the corresponding delivery accommodation chamber 14, takes out the delivery parcel from the delivery accommodation chamber 14, and performs delivery to the sending destination.

Figure 3:
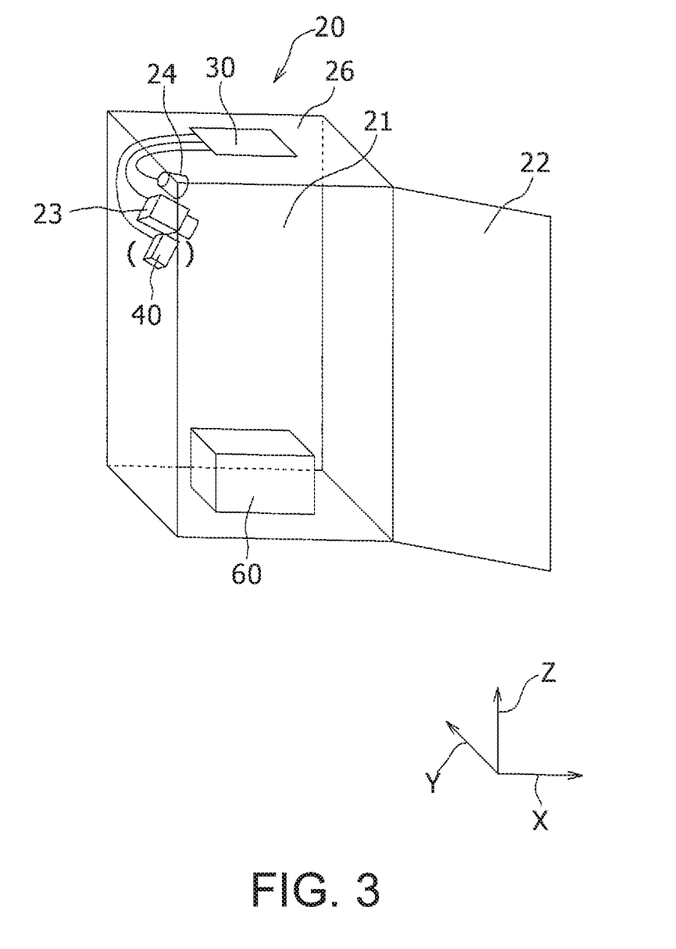
FIG. 3 is a perspective view showing a measurement device as a shape identification device in the delivery box shown in FIG. 1.
Figure 4:
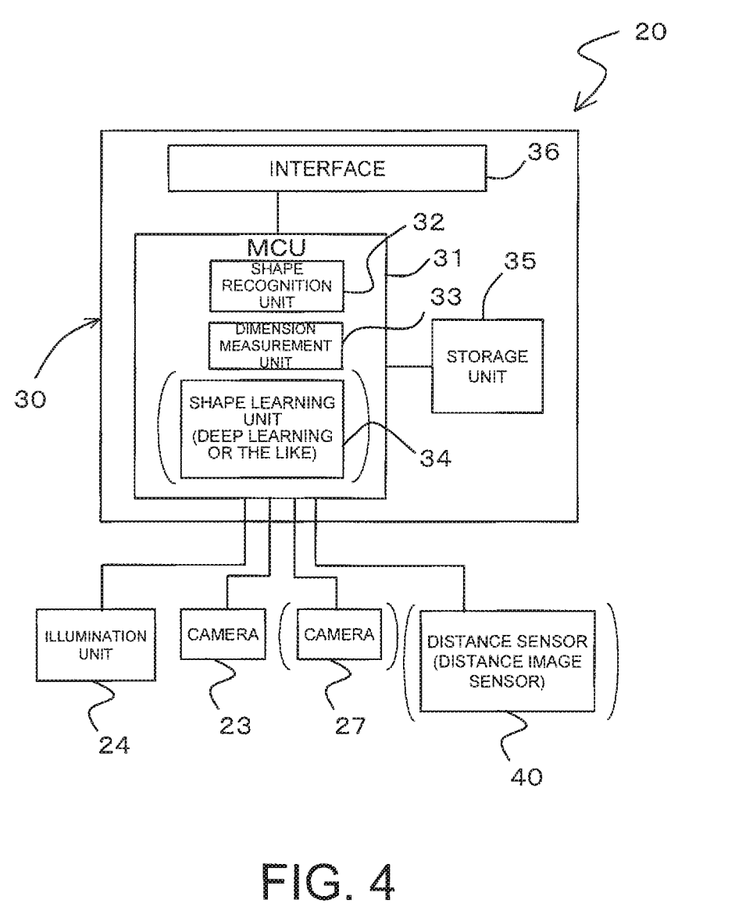
FIG. 4 is a configuration diagram of the measurement device shown in FIG. 3.

Next, the measurement device 20 will be described in detail. FIG. 3 is a perspective view showing the measurement device 20 in the delivery box 12. FIG. 4 is a configuration view of the measurement device 20. The measurement device 20 includes the above-described measurement accommodation chamber 21 and door 22, a first camera 23 for shape recognition, an illumination unit 24, and a control device 30. The first camera 23 corresponds to a first imaging unit, and the control device 30 corresponds to an image processing unit. The measurement device 20 is a shape identification device, and the control device 30 also has a dimension measurement unit 33 (FIG. 4) described later. In FIG. 3, the first camera 23, the illumination unit 24, and a distance sensor 40 described later are shown as if they can be seen through.

The measurement accommodation chamber 21 has a box-like shape for accommodating a delivery parcel 60 such that it is allowed to be taken in and out. As described above, the opening on one side in the depth direction Y (the front side on the paper surface in FIG. 3) of the measurement accommodation chamber 21 is blocked by the door 22. The door 22 of the measurement accommodation chamber 21 may be configured to be locked and unlocked with an electric lock, and the electric lock may be configured to be unlocked by a user operation or the like on the operation display unit 17 (FIG. 1).

The first camera 23 is arranged to be directed obliquely downward so as to image the delivery parcel 60, for example, from a corner portion of an upper portion on an opening side of the measurement accommodation chamber 21, for example, one end portion (a left end in FIG. 3) in the width direction X. For example, a CCD camera is used as the first camera 23. The first camera 23 may be a CMOS camera. The operation of the first camera 23 is controlled by the control device 30, and information on an image captured by the first camera 23 is transmitted to the control device 30. An image to be captured by the first camera 23 may be a grayscale image or a color image. When the image is color, the image may be converted to a grayscale image during execution of image processing. Note that FIG. 3 is a view in which the control device 30 is arranged on a top plate 26 constituting an upper end of the measurement accommodation chamber 21, but the present invention is not limited to this configuration, and the control device 30 may be arranged around the operation display unit 17 of the delivery box 12 shown in FIG. 1.

The illumination unit 24 is arranged near the first camera 23 at the upper portion of the measurement accommodation chamber 21, and illuminates the inside of the measurement accommodation chamber 21, particularly, a lower part thereof. The illumination unit 24 is controlled to be turned on and off by the control device 30. For example, a white LED is used as the illumination unit 24. A fluorescent lamp, a light bulb, or an LED of another color may be used as the illumination unit 24.

Note that the measurement device 20 may include a distance sensor 40 which is a measurement sensor. The distance sensor 40 is, for example, a distance image sensor. For example, a distance image sensor includes a light source such as a near-infrared LED that blinks a light emission pulse at high speed, and a CMOS image sensor, and measures, by each pixel in real time, a time taken for emitted light to impinge on an object and return. As a result, a distance image including distance information indicating the degree of length of the distance can be formed. For this reason, since the degree of length of the distance between the surface of the object can also be acquired and the captured distance image, a three-dimensional external shape of the delivery parcel 60 can be more easily identified. The detection information of the distance sensor 40 is transmitted to the control device 30. Furthermore, the distance sensor 40 makes it easy to measure the dimensions of the object such as length, width, and depth. The distance sensor 40 is used to measure the dimensions of the delivery parcel 60 accommodated in the measurement accommodation chamber 21.

As shown in FIG. 4, the control device 30 includes, for example, an arithmetic processing unit 31 configured by an MCU (Micro Controller Unit), and a storage unit 35. The storage unit 35 may be RAM, ROM, or the like. The arithmetic processing unit 31 has a function of reading and executing a program or the like stored in advance in the storage unit 35. The storage unit 35 has a function of temporarily storing a read-out program and processing data, and a function of storing a control program, a predetermined threshold, and the like in advance. Furthermore, images of a plurality of types of sample external shapes, which correspond to external shapes of delivery parcels, are stored in advance in the storage unit 35.

For example, various external shapes such as a rectangular parallelepiped, a column, a disk, and a hexagonal column can be considered for delivery parcels. In general, each type of external shape has different images when it is viewed from different directions. For this reason, images captured from a plurality of different directions are preferably stored in advance in the storage unit 35 for each type of external shape.

When the control device 30 executes a program, the main function of the device, system, or method according to the present disclosure is implemented. The type of the arithmetic processing unit 31 is not limited as long as the function thereof can be implemented by executing the program. For example, the arithmetic processing unit may be a CPU. The arithmetic processing unit may be configured by one or more electronic circuits including a semiconductor integrated circuit (IC) or an LSI (large scale integration). The plurality of electronic circuits may be integrated on a single chip, or may be provided on a plurality of chips. A plurality of chips may be integrated in a single device, or may be provided in a plurality of devices. A non-transitory recording medium such as an optical disk or a hard disk drive may be used as the storage unit. An external storage device may be connected as the storage unit to the control device 30. The program may be stored in a recording medium in advance, or may be supplied to the recording medium via a wide area communication network including the Internet or the like.

The control device 30 also includes an interface 36. The operation display unit 17 (FIG. 1) is connected to the arithmetic processing unit 31 via the interface 36. At least one of a personal computer (PC), an input device, and a monitor as a display may be connected to the arithmetic processing unit via the interface 36.

The arithmetic processing unit 31 further includes a shape recognition unit 32 and a dimension measurement unit 33. The shape recognition unit 32 constitutes a shape identification device. The dimension measurement unit 33 is used to measure the dimension of the delivery parcel 60 accommodated in the measurement accommodation chamber 21 (FIG. 3).

The shape recognition unit 32 compares external shape information acquired from the first camera 23 with information on a plurality of types of external shapes stored in the storage unit 35 to perform identification, and recognizes an external shape which matches or approximates to the external shape information from the first camera 23. Therefore, the shape recognition unit 32 recognizes an external shape matching or approximating to the external shape information from the first camera 23, for example, by using a model for identification of external shapes of delivery parcels, which has been created by learning based on machine learning. At this time, as the model for identification of external shapes, a model may be used in which images of samples have been learned based on deep learning using a neural network having a multilayer structure in which an input layer, two or more intermediate layers, and an output layer are connected by neurons. In this case, by inputting the external shape information from the first camera 23 to the input layer, it is also possible to recognize an external shape represented by sample external shape information which is stored in the storage unit 35 and matches or approximates to the external shape information from the first camera 23. For example, when a rectangular parallelepiped delivery parcel is imaged by the first camera 23, the external shape of the delivery parcel can be recognized as a rectangular parallelepiped shape by using a matching or approximating external shape out of external shape information stored in the storage unit 35. For example, in the shape recognition unit 32, when a degree of approximation is determined by a predetermined evaluation method for approximation, it is possible to recognize an external shape of external shape information from the storage unit to which the external shape information from the first camera has a predetermined approximation degree or more.

Further, the shape recognition unit 32 may perform filter processing for removing noise in an image captured by the first camera 23 before comparing the image with the external shape information stored in the storage unit 35. After that, the image may be subjected to binarization processing so as to clarify the edge of the external shape of the delivery parcel 60 (FIG. 3).

Further, the arithmetic processing unit 31 may be configured to include a shape learning unit 34. For example, the shape learning unit 34 may additionally store, in the storage unit 35, external shape information from the first camera 23 which corresponds to an external shape recognized by the shape recognition unit 32. As a result, an external shape which has not been stored in the storage unit 35 in advance can be easily identified and recognized by learning.

Further, the shape learning unit 34 may perform learning by additionally inputting information of a sample image associated with an external shape from the interface 36, and additionally store, in the storage unit 35, a model for identification of external shapes of delivery parcels 60 or 60*a* which has been created by the learning. At this time, the model for identification of external shapes may be a neural network having a multilayer structure that performs learning by deep learning.

The dimension measurement unit 33 is provided as a part of the measurement device 20 in the arithmetic processing unit 31, and measures the dimension of the delivery parcel 60, for example, a dimension used for volume measurement based on an external shape recognized by the shape recognition unit 32. Note that the distance sensor 40 (FIG. 4) may be used for dimension measurement. At this time, the dimension measurement unit 33 measures, for example, a dimension used for the volume measurement of the delivery parcel 60 based on the external shape recognized by the shape recognition unit 32, the distance detected by the distance sensor 40, and the information of the image captured by the first camera 23.

Figure 5:
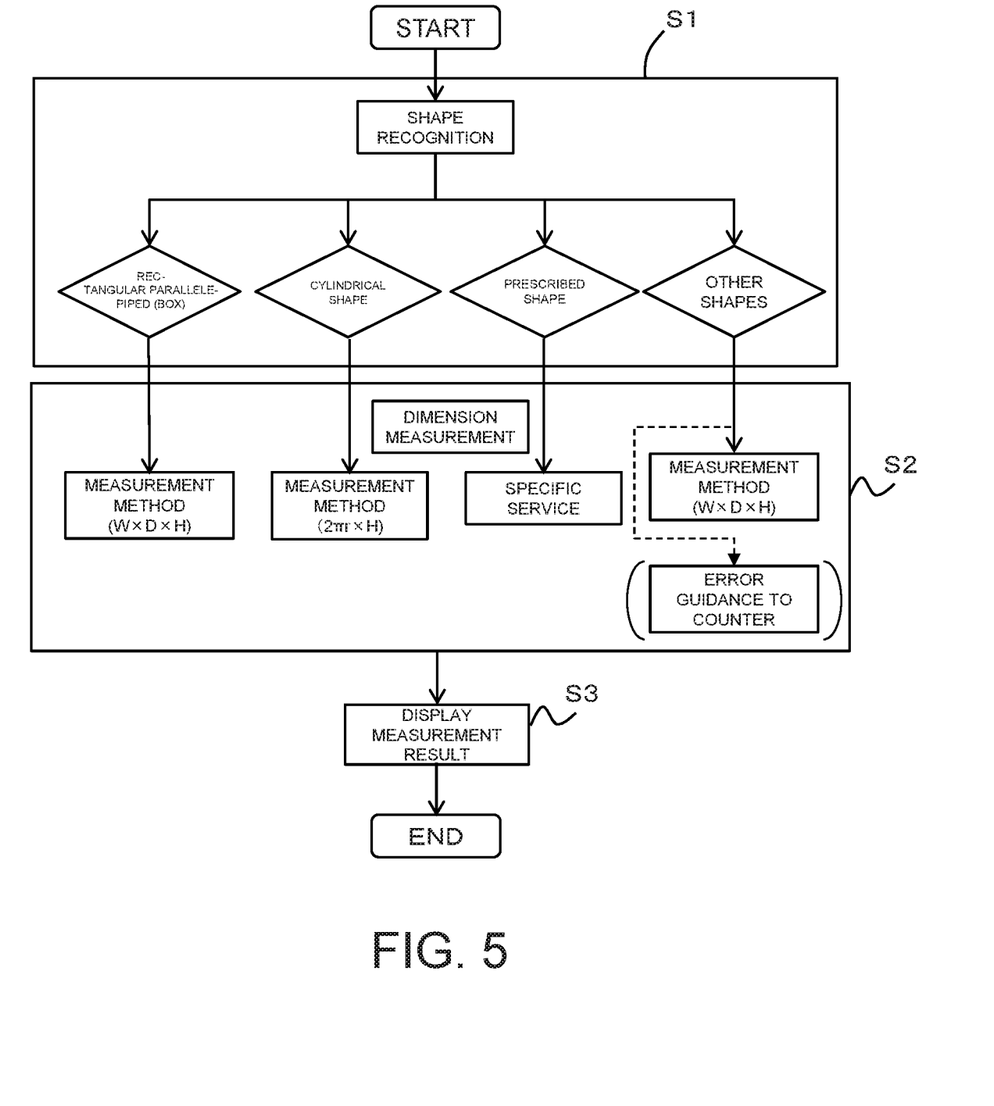
FIG. 5 is a flowchart showing shape recognition and dimension measurement in the embodiment.

FIG. 5 is a flowchart showing shape recognition and dimension measurement in the embodiment. In a state where the sender places a delivery parcel 60 in the measurement accommodation chamber 21 and closes the door 22, the shape recognition processing of the delivery parcel 60 is started in step S1. In the shape recognition processing, the shape recognition unit 32 compares external shape information from the first camera 23 with external shape information stored in the storage unit 35 to perform identification, and recognizes an external shape which matches or approximates to the external shape information from the first camera 23. For example, in an example shown in FIG. 5, the external shape is recognized as one of a rectangular parallelepiped shape (box-like shape), a cylindrical shape, a prescribed shape, and other shapes. The rectangular parallelepiped shape means shapes including a cube. The "prescribed shape" includes specific shapes other than the rectangular parallelepiped shape and the cylindrical shape and stored in the storage unit 35 in advance. For example, the prescribed shape is an elongated shape having a predetermined length or more, and includes, for example, a shape of a body in which a golf bag having golf clubs accommodated therein is packaged, a shape of a ski bag in which skis are accommodated, etc. "Other shapes" are shapes other than the rectangular parallelepiped shape, the cylindrical shape, and the prescribed shape.

Next, in step S2, the dimension measurement processing is performed. In the dimension measurement processing, the dimension measurement and the volume calculation are executed by different measurement methods according to the external shape recognized by the shape recognition unit 32. For example, when the external shape is recognized as the rectangular parallelepiped shape, the volume is calculated by width W×depth D×height H. For this reason, the dimension measurement unit 33 measures the width W, the depth D, and the height H of the delivery parcel, and thereafter calculates the volume based on the measured dimensions.

When the external shape is recognized as the cylindrical shape, the volume is calculated by 2×π×radius r×height H. Therefore, the dimension measurement unit 33 measures the radius r and the height H of the delivery parcel, and thereafter calculates the volume based on the measured dimensions.

When the external shape is recognized as the prescribed shape, a specific service is executed. In the specific service, for example, only the entire length is measured as the dimension, or a dimension measured value and a volume calculated value are respectively assumed and set as a predetermined dimension and a predetermined volume.

When the external shape is recognized as the other shape, the volume measurement method is simply determined as width W×depth D×height H. Then, the dimension measurement unit 33 measures the width W, the depth D, and the height H of the delivery parcel, and calculates the volume based on the measured dimensions. Alternatively, when the external shape is recognized as the other shape, processing to guide the sender to a counter may be executed as error processing.

Next, in step S3, results which have been measured and calculated in the dimension measurement processing are displayed on the operation display unit 17. At this time, when processing corresponding to "specific service" or "other shapes" is executed in the dimension measurement processing, the fact that the processing has been executed, and a corresponding value, are displayed. Note that when the processing corresponding to "other shapes" is executed, guidance for guiding the sender to the counter of the delivery company ("Please come to the counter" or the like) is displayed as error processing on the operation display unit 17. The end of step S3 causes the processing of shape recognition and dimension measurement to terminate. When the measurement result and the calculation result are displayed on the operation display unit 17, a sending fee corresponding to the calculation result may be displayed. When the "specific service" is executed in the dimension measurement processing, a sending fee corresponding to the service may be displayed on the operation display unit 17.

Figure 6:
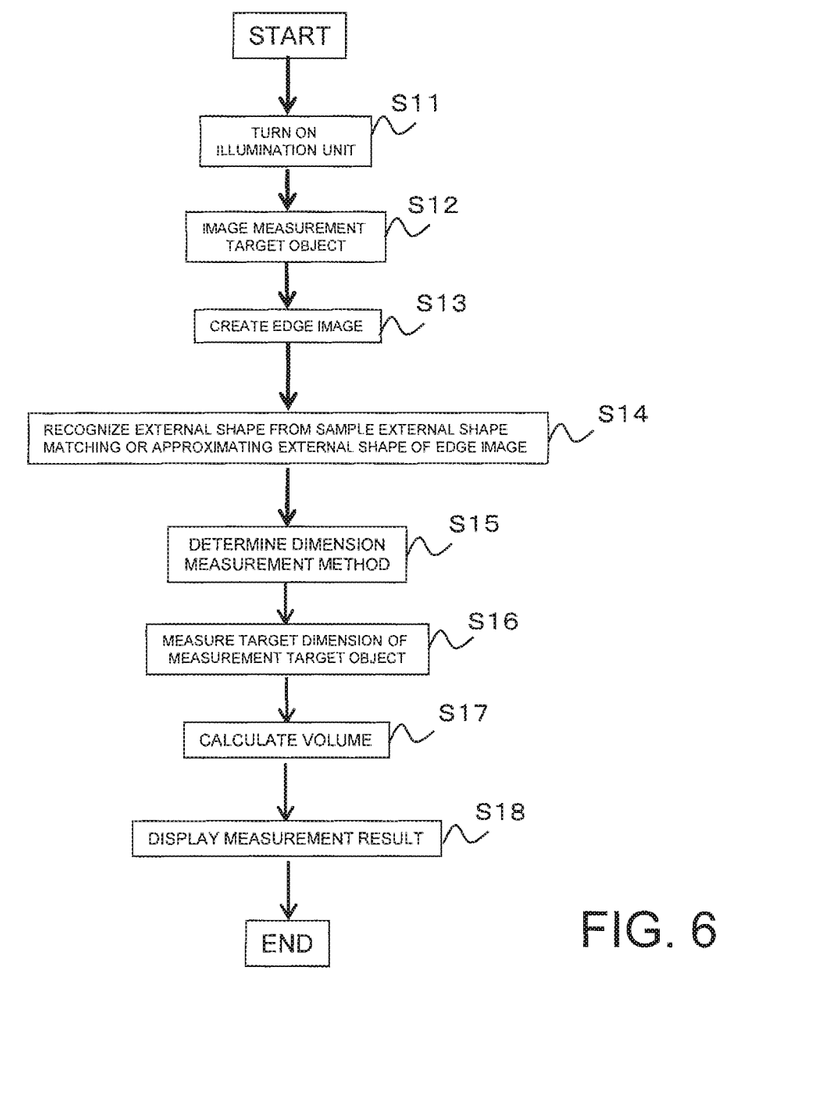
FIG. 6 is a flowchart showing shape recognition and dimension measurement in the embodiment in greater detail.
Figure 7:
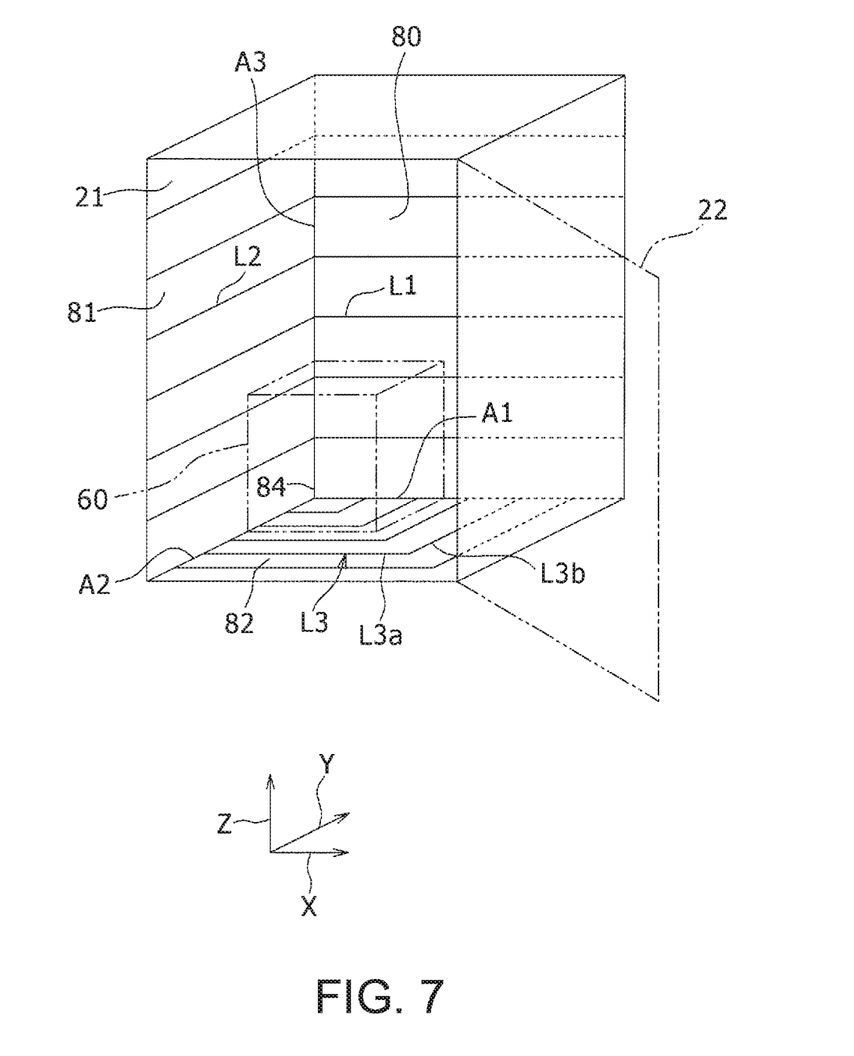
FIG. 7 is a perspective view showing an example of an accommodation chamber of the measurement device.

FIG. 6 is a flowchart showing shape recognition and dimension measurement in the embodiment in greater detail. FIG. 7 is a perspective view showing an example of the measurement accommodation chamber 21 of the measurement device 20.

In step S11 of FIG. 6, the illumination unit 24 provided in the measurement accommodation chamber 21 is turned on, so that the measurement accommodation chamber 21 becomes bright. In step S12, the delivery parcel (measurement target object) 60 is imaged by the first camera 23. At this time, the distance to the delivery parcel 60 may be detected by the distance sensor 40.

At this time, as shown in FIG. 7, first lines L1, second lines L2 and third lines L3, as a plurality of reference lines, may be drawn on a first side surface portion 80, a second side surface portion 81, and a lower surface portion 82 constituting the measurement accommodation chamber 21. The first side surface portion 80, the second side surface portion 81, and the lower surface portion 82 intersect one another at a corner portion 84 of a reference point at the other end in the depth direction Y of the measurement accommodation chamber 21. The first side surface portion 80 is located at the other end in the depth direction Y. The plurality of reference lines serve to enhance the measurement accuracy of the dimension measurement, and are similar to a configuration described in Patent Literature 1.

Figure 8:
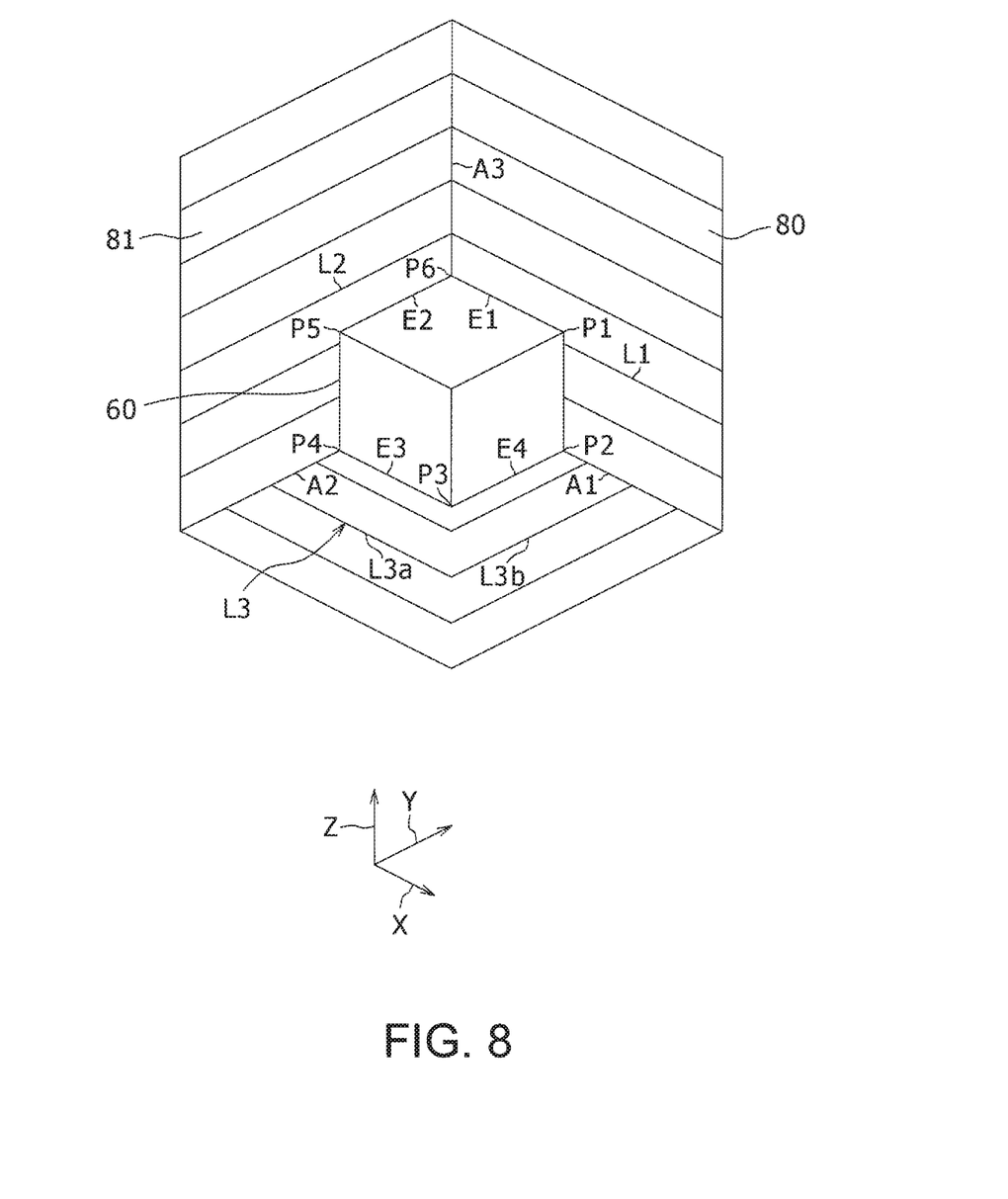
FIG. 8 is a diagram showing an edge image created based on an image captured by an imaging unit when a delivery parcel as a measurement target object is a rectangular parallelepiped object.
Figure 9:
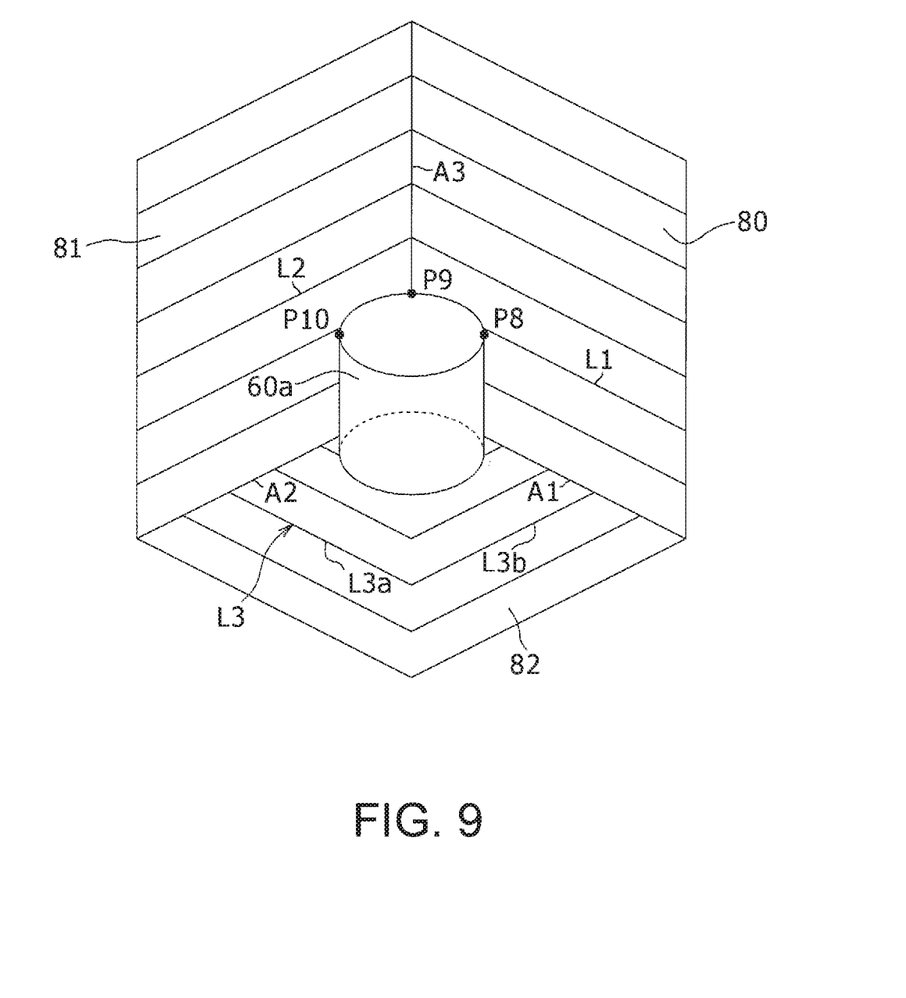
FIG. 9 is a diagram showing an edge image created based on an image captured by the imaging unit when the delivery parcel has a cylindrical shape.

Specifically, the first side surface portion 80 intersects the lower surface portion 82 on a first boundary line A1. The second side surface portion 81 intersects the lower surface portion 82 on a second boundary line A2. The first side surface portion 80 and the second side surface portion 81 intersect each other on a third boundary line A3. The plurality of first lines L1 drawn on the first side surface portion 80 are straight lines that are arranged at equal intervals parallel to the first boundary line A1. The plurality of second lines L2 drawn on the second side surface portion 81 are straight lines that are arranged at equal intervals parallel to the second boundary line A2. Each of the plurality of third lines L3 drawn on the lower surface portion 82 has an L-shape that is bent at a right angle in the middle thereof, and first straight line portions L3a located on one end side and parallel to the first boundary line A1 and second straight line portions L3b located on the other end side and parallel to the second boundary line A2 are connected to each other. Colors that are different from the respective colors of the first side surface portion 80, the second side surface portion 81, and the lower surface portion 82, and have luminance values which are greatly apart from one another, are preferably used for the respective lines L1, L2, and L3. As shown in FIGS. 8 and 9 described later, the delivery parcels 60 and 60a are preferably arranged on the lower surface portion 82 so as to be pushed toward the third boundary line A3 in the measurement accommodation chamber 21.

In step S13 of FIG. 6, the shape recognition unit 32 acquires an image captured by the first camera 23. FIG. 8 is a view showing an edge image created based on an image captured by the first camera 23 when the delivery parcel 60 is a rectangular parallelepiped. FIG. 9 is a view showing an edge image created based on an image captured by the first camera 23 when the delivery parcel 60a has a cylindrical shape.

When the delivery parcel 60 is a rectangular parallelepiped, for example, an image shown in FIG. 8 is obtained. When the delivery parcel 60a has a cylindrical shape, for example, an image shown in FIG. 9 is obtained.

An image of the plurality of first lines L1, second lines L2, and third lines L3 may be stored in advance in the storage unit 35 as mask data for performing mask processing, and the shape recognition unit 32 may perform the mask processing on an image shown in FIG. 8 or FIG. 9 using the mask data. As a result, the first lines L1, the second lines L2, and the third lines L3 can be deleted from the image to create an image for shape recognition. Therefore, the edges of the external shapes of the delivery parcels 60 and 60a become clearer in the shape recognition images, so that the external shapes are more easily identified. The edge image is created by performing filter processing for removing noise on the image captured by the first camera 23. By performing the binarization processing on the edge image, the edges of the external shapes of the delivery parcels 60 and 60a may be further clarified.

In step S14 of FIG. 6, the shape recognition unit 32 compares the external shape information acquired from the first camera 23 with the plurality of types of external shape information stored in the storage unit 35 to perform identification, and recognizes an external shape that matches or approximates to the external shape information from the first camera 23.

In step S15 in FIG. 6, the control device 30 determines a dimension measurement method corresponding to the recognized external shape. For example, in the case of the delivery parcel 60 shown in FIG. 8, when the external shape thereof is recognized as a rectangular parallelepiped shape, the dimension measurement method of the volume is determined as width W×depth D×height H.

Next, in step S16, the dimension measurement unit 33 measures a target dimension corresponding to the determined dimension measurement method. For example, when the dimension measurement method of the volume is determined as width W×depth D×height H for the delivery parcel 60 shown in FIG. 8, the dimension measurement unit 33 determines the width W, the depth D and the height H of the delivery parcel 60. At this time, the dimension measurement unit 33 may measure the dimension by using an image in which the first lines L1, the second lines L2, and the third lines L3 are left in the edge image acquired by the first camera 23. For example, in the image shown in FIG. 8, edges and vertices of the delivery parcel 60 are detected, and the height H of the delivery parcel 60 may be measured according to where a line E1 connecting the top vertices P1 and P6 out of the vertices P1 to P6 is located with respect to the plurality of first lines L1 on the first side surface portion

80. In FIG. 8, since it is detected that the line E1 connecting the vertices P1 and P6 is located between second and third first lines L1 from the bottom, the height H is measured as a certain range, for example. At this time, the height H of the delivery parcel 60 may be measured according to where a line E2 connecting the top vertices P5 and P6 out of the vertices P1 to P6 is located with respect to the plurality of second lines L2 on the second side surface portion 81. Further, similarly to the measurement of the height H, the width W of the delivery parcel 60 may be measured according to where a line E3 connecting the vertices P3 and P4 is located with respect to the first straight line portions L3a of the plurality of third lines L3 on the lower surface portion 82. Further, similarly to the measurement of the height H, the depth D of the delivery parcel 60 may be measured according to where a line E4 connecting the vertices P2 and P3 is located with respect to the second straight line portions L3b of the plurality of third lines L3 on the lower surface portion 82.

In a case where the delivery parcel 60a shown in FIG. 9 is recognized as having a cylindrical shape, when the dimension measurement method of the volume is determined as 2×π×radius r×height H, the dimension measurement unit 33 measures the radius r and the height H of the delivery parcel 60. At this time, the dimension measurement unit 33 may measure the dimension by using an image in which the first lines L1, the second lines L2, and the third lines L3 are left in the edge image acquired by the first camera 23. For example, edges and vertices of the delivery parcel 60a are detected in the image shown in FIG. 9, and the height H of the delivery parcel 60 may be measured according to where an arc passing through the top vertices P8 to P10 is located with respect to the plurality of first lines L1 on the first side surface portion 80. Further, the height H of the delivery parcel 60 may be measured according to where the arc is located with respect to the plurality of second lines L2 on the second side surface portion 81. Still further, it is possible to estimate a circle when the direction of the line of sight is changed so that an ellipse containing the arc passing through the vertices P8 to P10 becomes the circle, and measure the radius r of the estimated circle.

Next, in S17, the dimension measurement unit 33 calculates the volumes of the delivery parcels 60 or 60a (FIG. 8 or 9) by the determined dimension measurement method based on the measured dimensions.

In step S18, the control device 30 causes the display unit to display the dimension measured by the dimension measurement unit 33 and the volume calculated by the dimension measurement unit 33.

According to the measurement device 20 and the delivery box 12, the shapes of the delivery parcels 60 or 60a accommodated in the measurement accommodation chamber 21 can be automatically identified. As a result, it is unnecessary for the sender of the delivery parcel to input the shape of the delivery parcel 60, 60a, thereby enhancing the convenience for the sender.

As described above, the measurement device 20 may include the distance sensor 40 for detecting the distances to the delivery parcels 60 or 60a. At this time, the external shape to be stored in the storage unit 35 may be associated with the distance information. Then, the shape recognition unit 32 associates the external shape information from the first camera 23 with the distance information from the distance sensor 40, and compares the external shape information from the first camera 23 with the external shape information stored in the storage unit 35 to perform identification. At this time, the shape recognition unit 32 recognizes an external shape that matches or approximates to the external shape information from the first camera 23. As a result, the recognition accuracy of the external shape is further improved. In addition, the accuracy of dimension measurement of the delivery parcels 60 or 60a can be enhanced by using the detection result of the distance sensor 40. The foregoing description has been given for the case where the first lines L1, the second lines L2, and the third lines L3 are drawn in the measurement accommodation chamber 21, but these lines may be omitted. In the case where the distance sensor 40 is used, the dimensions of the delivery parcels 60 and 60a can be easily measured by using the detection result of the distance sensor 40 even when the lines of the measurement accommodation chamber 21 are omitted. Further, even when the delivery parcels 60 or 60a are moved from the side of the third lines L3, which is the other end in the depth direction Y, to the opening side and placed in an arbitrary orientation in the measurement accommodation chamber 21, it is easy to recognize the external shapes of the delivery parcels 60 and 60a by using the acquired image from the first camera 23 and the detection result of the distance sensor 40. At the same time, it is easy to measure the dimensions of the external shape.

Further, as the measurement accommodation chamber a chamber may be used in which the above-described lines L1 to L3 are not provided, and rectangular frames are drawn at peripheral edge portions of the first side surface portion 80, the second side surface portion 81, and the lower surface portion 8. The inside of the measurement accommodation chamber is imaged in advance by the camera in a state where there is no object such as a delivery parcel, and based on the imaging data, it is possible to create correction data for distortion correction, etc. of the external shape of a measurement target object in a captured image of the accommodation chamber in which the measurement target object is placed. On the other hand, when the measurement accommodation chamber in which first lines L1, second lines L2, and third lines L3, those are arranged at equal internals, are drawn as in the above case is used, the accuracy of the dimension measurement can be further enhanced by using the correction data.

Figure 10:
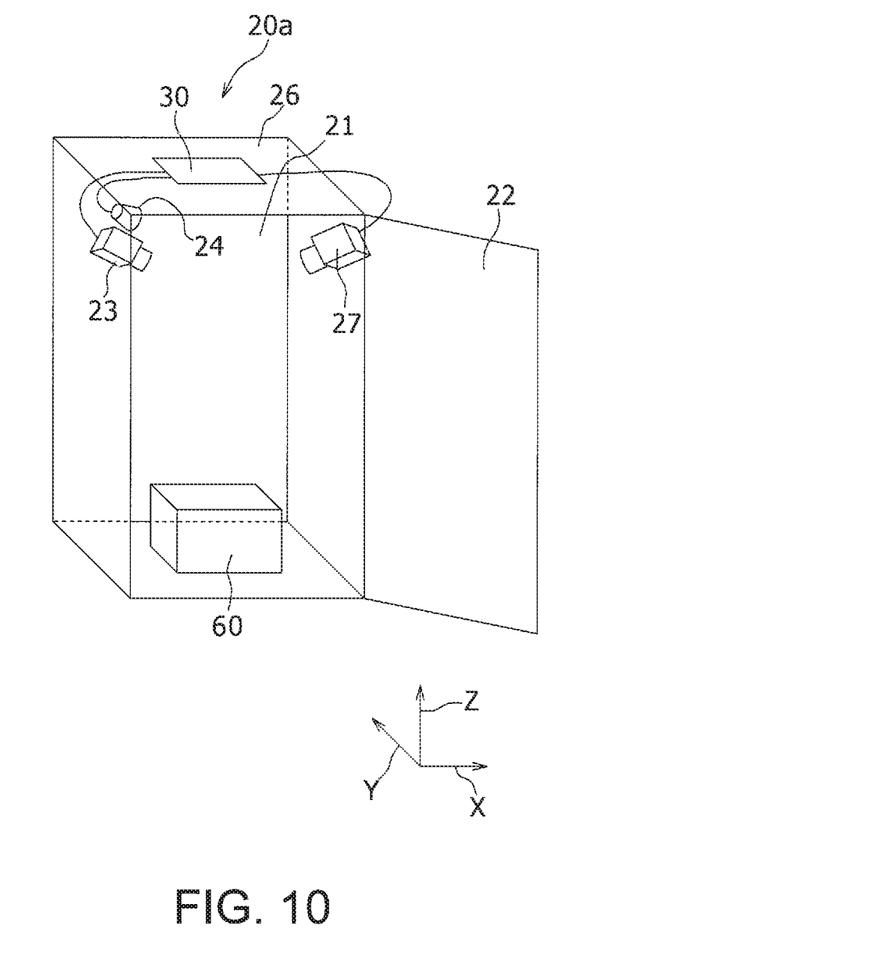
FIG. 10 is a perspective view showing a measurement device as a shape identification device according to another example of the embodiment.

FIG. 10 is a perspective view showing a measurement device 20a as a shape identification device according to another example of the embodiment. In the configuration of this example, the measurement device 20a includes a second camera 27 that is a second imaging unit. The measurement device 20a includes no distance sensor. The configuration of the second camera 27 is similar to that of the first camera 23, and is connected to the control device 30. The operation of the second camera 27 is controlled by the control device 30. The second camera 27 images the delivery parcel 60 in a direction that is different to a direction in which the first camera 23 performs imaging, for example, from the other end in the width direction X (a right end portion in FIG. 10), for example, at a corner portion of the upper portion on the opening side of the measurement accommodation chamber 21. Information of an image captured by the second camera 27 is transmitted to the control device 30.

The shape recognition unit 32 equipped in the control device 30 compares the external shape information from the first camera 23 and the external shape information from the second camera 27 with the external shape information stored in the storage unit 35 to perform identification. Then, the shape recognition unit 32 recognizes an external shape that matches or approximates to the external shape information from at least one of the first camera 23 and the second camera 27. For example, when the degree of approximation is determined by a preset evaluation method for approximation, it is possible to recognize an external shape of external shape information from the storage unit 35 to which the external shape information from one or both of the first camera 23 and the second camera 27 has a predetermined approximation degree or more.

According to the above configuration, the recognition accuracy of the external shape is enhanced. Further, the accuracy of the dimension measurement of the delivery parcel 60 can be enhanced by using the external shape information from the second camera 27. Further, even when the delivery parcel 60 is moved from the other end in the depth direction Y (the rear end of the paper surface of FIG. 10) to the opening side and placed in an arbitrary orientation in the measurement accommodation chamber 21, it is easy to recognize the external shape of the delivery parcel 60 by using the acquired images from the first camera 23 and the second camera 27. At the same time, it is easy to measure the dimensions of the external shape. In this example, other configurations and operations are similar to those in the configurations of FIGS. 1 to 9.

Note that in each of the above-described examples, the case where the dimensions of the delivery parcel are measured and then the volume thereof is determined has been described, but these examples are not limited to this manner, and may be configured so that only required dimensions corresponding to the external shape of the delivery parcel are measured and the volume thereof is not determined. For example, the sending fee may be determined according to measured required dimensions.

Note that in the configuration of each of the above-described examples, the dimension measurement unit may be provided separately from the shape identification device. In this case, the dimension measurement unit measures the dimension of a measurement target object based on an external shape recognized by the shape recognition unit 32 (FIG. 4).

Further, the delivery box 12 (FIG. 1) may be configured so that the plurality of delivery accommodation chambers include a plurality of types of accommodation chambers having different sizes, and according to the dimension of a delivery parcel measured by the measurement device 20, the door of an accommodation chamber having the corresponding size is unlocked. At this time, the sender can accommodate a delivery parcel in the unlocked accommodation chamber and make a delivery request.

REFERENCE SIGNS LIST 12 delivery box, 13 exterior body, 14 delivery accommodation chamber, 15 door, 17 operation display unit, 18 electric lock, 19 package sensor, 20, 20a measurement device, 21 measurement accommodation chamber, 22 door, 23 first camera, 24 illumination unit, 26 top plate unit, 27 second camera, 30 control device, 31 arithmetic processing unit, 32 shape recognition unit, 33 dimension measurement unit, 34 shape learning unit, 35 storage unit, 36 interface, 40 distance sensor, 60, 60a delivery parcel, 70 settlement unit, 71 communication network, 72, 73 terminal device, 74 management server, 80 first side surface portion, 81 second side surface portion, 83 lower surface portion, 84 corner portion.

The invention claimed is:

1. A delivery box comprising:
    an accommodation chamber provided in the delivery box for accommodating a measurement target object, which is a delivery parcel for which dimension is to be measured, such that the measurement target object is allowed to be taken in and out;
    a first imaging device that images the measurement target object accommodated in the accommodation chamber; and
    an image processor for performing image processing based on information of an image captured by the first imaging device to recognize an external shape of the measurement target object, wherein
    the image processor includes:
    a storage for storing, in advance, a plurality of types of sample external shapes corresponding to the measurement target object,
    a shape recognition device which compares external shape information from the first imaging device with external shape information stored in the storage to perform identification, and recognizes an external shape that matches or approximates to the external shape information from the first imaging device wherein the plurality of types of sample external shapes include a rectangular parallelepiped shape, a cylindrical shape, and an elongated shape having a predetermined length or more which is a prescribed specific shape other than the rectangular parallelepiped shape and the cylindrical shape, and
    a dimension measurement device which measures the dimension of the measurement target object based on the external shape recognized by the shape recognition device, wherein
    when the external shape of the measurement target object is recognized to be the rectangular parallelepiped shape or the cylindrical shape, the external shape of the measurement target object recognized by the shape recognition device is used for calculating a volume based on a result obtained by the dimension measurement device and displaying a sending fee, corresponding to the calculation result of the volume, on a display, and, when the external shape of the measurement target object is recognized to be the elongated shape having a predetermined length or more, the external shape of the measurement target object recognized by the shape recognition device is used for displaying a sending fee, corresponding to a specific service which is set in advance, on the display.

* * * * *